US010234246B1

(12) United States Patent
Wu

(10) Patent No.: US 10,234,246 B1
(45) Date of Patent: Mar. 19, 2019

(54) REAR COVER OF A DARTBOARD AND A NOISE ATTENUATION STRUCTURE THEREOF

(71) Applicant: JINWEI PLASTIC MODEL HARDWARE FTY. LTD., Hong Kong (CN)

(72) Inventor: Hsien-Ta Wu, Hong Kong (CN)

(73) Assignee: Jinwei Plastic Model Hardware Fty. Ltd., Tsuen Wan (HK)

( * ) Notice: Subject to any disclaimer, the term of this patent is extended or adjusted under 35 U.S.C. 154(b) by 0 days.

(21) Appl. No.: 15/811,142

(22) Filed: Nov. 13, 2017

(51) Int. Cl.
  *F41J 3/00* (2006.01)
  *F16F 7/00* (2006.01)

(52) U.S. Cl.
  CPC ............. *F41J 3/0009* (2013.01); *F16F 7/00* (2013.01)

(58) Field of Classification Search
  CPC .. F41J 3/00; F41J 3/0009; F41J 3/0004; F41J 3/0042; F41J 5/056; F41J 5/04
  USPC .................................................. 273/371–377
  See application file for complete search history.

(56) References Cited

U.S. PATENT DOCUMENTS

| | | | | |
|---|---|---|---|---|
| 5,275,418 A * | 1/1994 | Yiu | ............................ | F41J 5/04 273/376 |
| 6,047,968 A * | 4/2000 | Lu | ............................ | F41J 5/052 273/371 |
| 6,089,571 A * | 7/2000 | Cho | ............................ | F41J 5/048 273/371 |
| 6,215,390 B1 * | 4/2001 | Lin | ............................ | F41J 5/052 273/371 |
| 6,302,809 B1 * | 10/2001 | Yiu | ............................ | F41J 3/0066 473/376 |
| 6,450,501 B1 * | 9/2002 | Yiu | ............................ | F41J 5/052 273/376 |
| 7,163,204 B1 * | 1/2007 | Liao | ............................ | F41J 3/0057 273/348.3 |
| 9,651,344 B1 * | 5/2017 | Chiu | ............................ | F41J 5/14 |
| 2002/0070501 A1 * | 6/2002 | Shao | ............................ | F41J 5/04 273/371 |
| 2012/0248702 A1 * | 10/2012 | Kim | ............................ | F41J 3/00 273/348.3 |

* cited by examiner

*Primary Examiner* — Mark S Graham
(74) *Attorney, Agent, or Firm* — Wang Law Firm, Inc.

(57) ABSTRACT

A rear cover of a dartboard and a noise attenuation structure thereof includes: a rear cover, a shock and sound attenuation pad and a scoring board. The rear cover includes a plurality of reinforced ribs with a zigzag shape, every two reinforced ribs defines a resonant space. The shock and sound absorbing pad is provided with a plurality of grooves, every two said grooves define a stuffing portion, the reinforced ribs are disposed in the grooves, and the stuffing portions are stuffed in the resonant spaces, so as to reduce the resonant box. The zigzag reinforced ribs make it difficult for the resonance to be produced in the resonant spaces, and the stuffing portions stuffed in the resonant spaces further prevent the occurrence of resonance.

12 Claims, 6 Drawing Sheets

REAR COVER OF A DARTBOARD AND A NOISE ATTENUATION STRUCTURE THEREOF

BACKGROUND

Field of the Invention

The present invention relates to a dartboard, and more particularly to a rear cover of a dartboard and a noise attenuation structure thereof

Related Prior Art

Referring to FIG. 1, a conventional dartboard 10 is used as a target in a game of darts for players to throw darts, and is divided into a plurality of areas. Each of the areas represents different scores, and the players can figure out their scores according to the location at which the dart lands.

FIG. 2 is an exploded view of the dartboard 10, and the dartboard 10 includes: a rear cover 11, a circuit board 12, a scoring board 13 and a decoration cover 14. A resonant box 15 is defined between the decoration cover 14 and the rear cover 11. The circuit board 12 has one surface electrically connected to the scoring board 13. The circuit board 12 and the scoring board 13 are disposed in the resonant box 15. The rear cover 11 is used as a support structure for supporting the circuit board 12, the decoration cover 14 is provided with an opening 141, and the scoring board 13 is located toward the opening 141.

When a player throws a dart, the dart will fly through the opening 141 and land onto the scoring board 13. However, when the dart is landing onto the scoring board 13, the vibration caused by the collision of the respective contact points will generate resonance in the resonant box 15, like a resonant box of an instrument. The vibration of the rear cover 11 will increase the contact area of the sounding body with respect to air molecules, so that the sound caused by the landing of the dart onto the scoring board 13 will be amplified, which makes the player feel uncomfortable.

The existing sound attenuation design for the dartboard 10 is to provide damping pads between the scoring board 13 and the circuit board 12 and inside the rear cover 11 as well, and the damping pads reduce the vibration caused by the landing of the dart onto the scoring board 13 so as to attenuate resonance, which consequently attenuates the volume of the sound. However, structural resonance still exists since the effect of reducing the volume of sound by the damping pads is limited.

The present invention has arisen to mitigate and/or obviate the afore-described disadvantages.

SUMMARY

One objective of the present invention is to provide a rear cover of a dartboard and a noise attenuation structure thereof, which is capable of attenuating the sound produced when throw the dart onto the dartboard.

To achieve the above objective, a rear cover of a dartboard and a noise attenuation structure thereof in accordance with the present invention comprises:

the rear cover including a bottom and a plurality of reinforced ribs disposed at the bottom of the rear cover;

a decoration cover including an opening which opens in a vertical direction, wherein the rear cover and the decoration cover define a receiving space in communication with the opening;

a scoring board disposed in the receiving space and provided with a scoring surface which is located towards the opening;

a circuit board disposed in the receiving space and electrically connected to the scoring board; and a shock and sound absorbing pad disposed in the receiving space and located between the bottom and the circuit board.

Preferably, the decoration cover includes a plurality of operation holes which open in the vertical direction and are in communication with the receiving space, and the circuit board includes an operation portion which is provided with a plurality of operation buttons extending out of the operation holes.

Preferably, the bottom includes a central portion at a center of the rear cover, and the plurality of reinforced ribs radially extends from the central portion towards a peripheral edge of the rear cover.

Preferably, each of the reinforced ribs includes a plurality of first sections and a plurality of second sections, the first and second sections are connected in an alternative manner, and each of the first sections defines an angle with respect to each of the second sections, so that each of the reinforced ribs as a whole has a zigzag shape.

Preferably, every two said reinforced ribs defines a resonant space with respect to the bottom, one surface of the shock and sound absorbing pad facing the bottom is a noise attenuation surface which is provided with a plurality of grooves, every two said grooves define a stuffing portion, the reinforced ribs are disposed in the grooves, and the stuffing portions are stuffed in the resonant spaces.

Preferably, the scoring surface is divided into a plurality of scoring areas, and in each of the scoring areas is disposed a target block which is provided with a plurality of dart holes for insertion of a dart.

Preferably, n the scoring surface is located towards the opening.

Preferably, one surface of the shock and sound absorbing pad facing the bottom is a noise attenuation surface which is provided with a recess and a plurality of grooves, the recess is located at a center of the noise attenuation surface, each of the grooves has one end connected to the recess and another end extending to a peripheral edge of the shock and sound absorbing pad, and the grooves are arranged in a radial manner.

Preferably, the damping pad is made of vibration buffering material and disposed between the scoring board and the circuit board.

Therefore, the rear cover of a dartboard and the noise attenuation structure thereof not only can attenuate the noise caused by dart throwing, but also can reduce the frequency of collision of parts. Besides, the reinforced ribs further can stabilize the overall structure of the rear cover, which prevents false judgment made by the circuit board, with the help of the reinforced ribs and the rear cover.

These together with other objects of the invention, along with the various features of novelty which characterize the invention, are pointed out with particularity in the claims annexed to and forming a part of this disclosure. For a better understanding of the invention, its operation advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
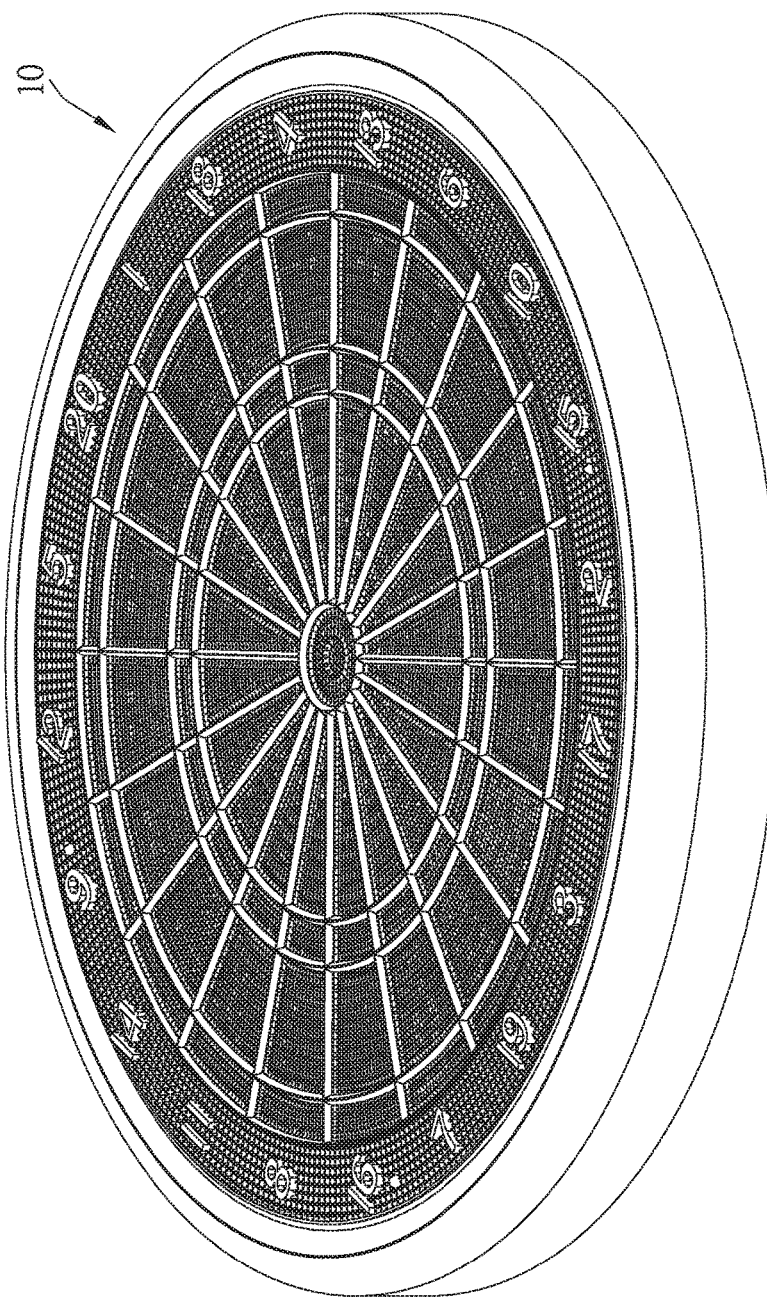
FIG. 1 is a perspective view of a conventional dartboard.
Figure 2:
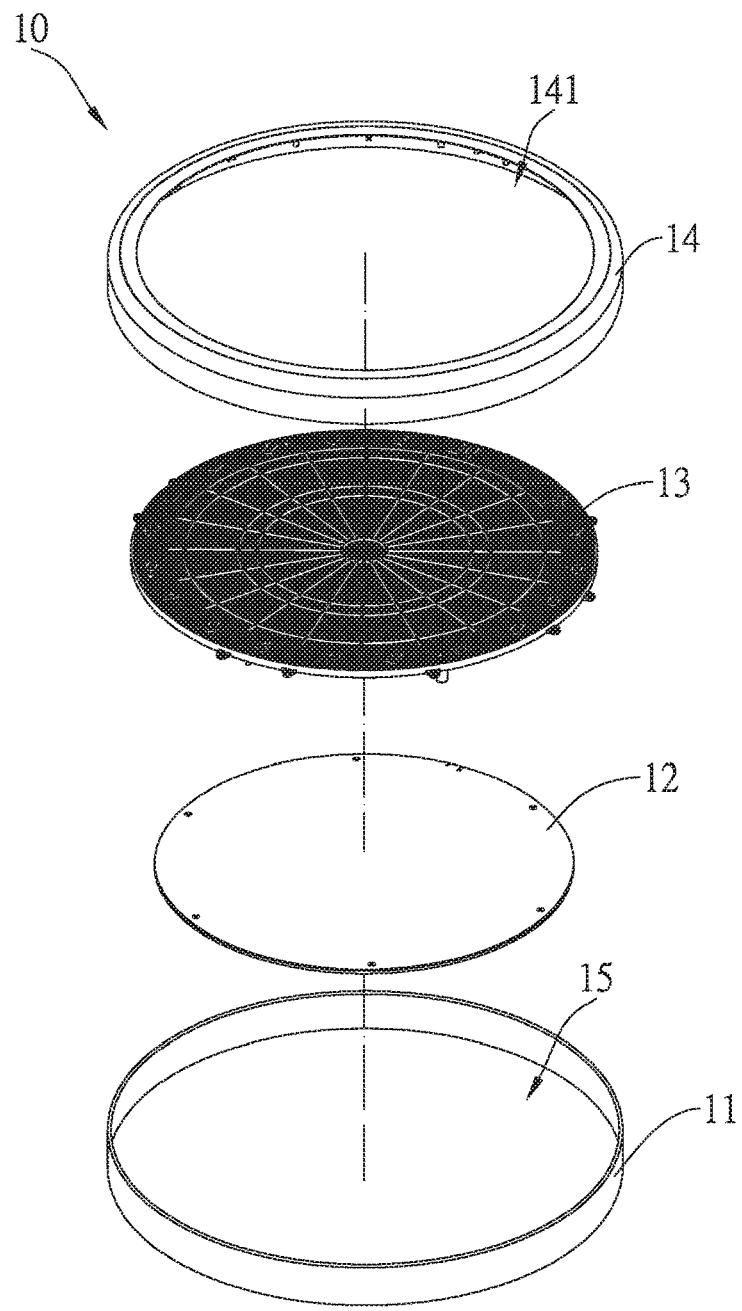
FIG. 2 is an exploded view of the conventional dartboard.
Figure 3:
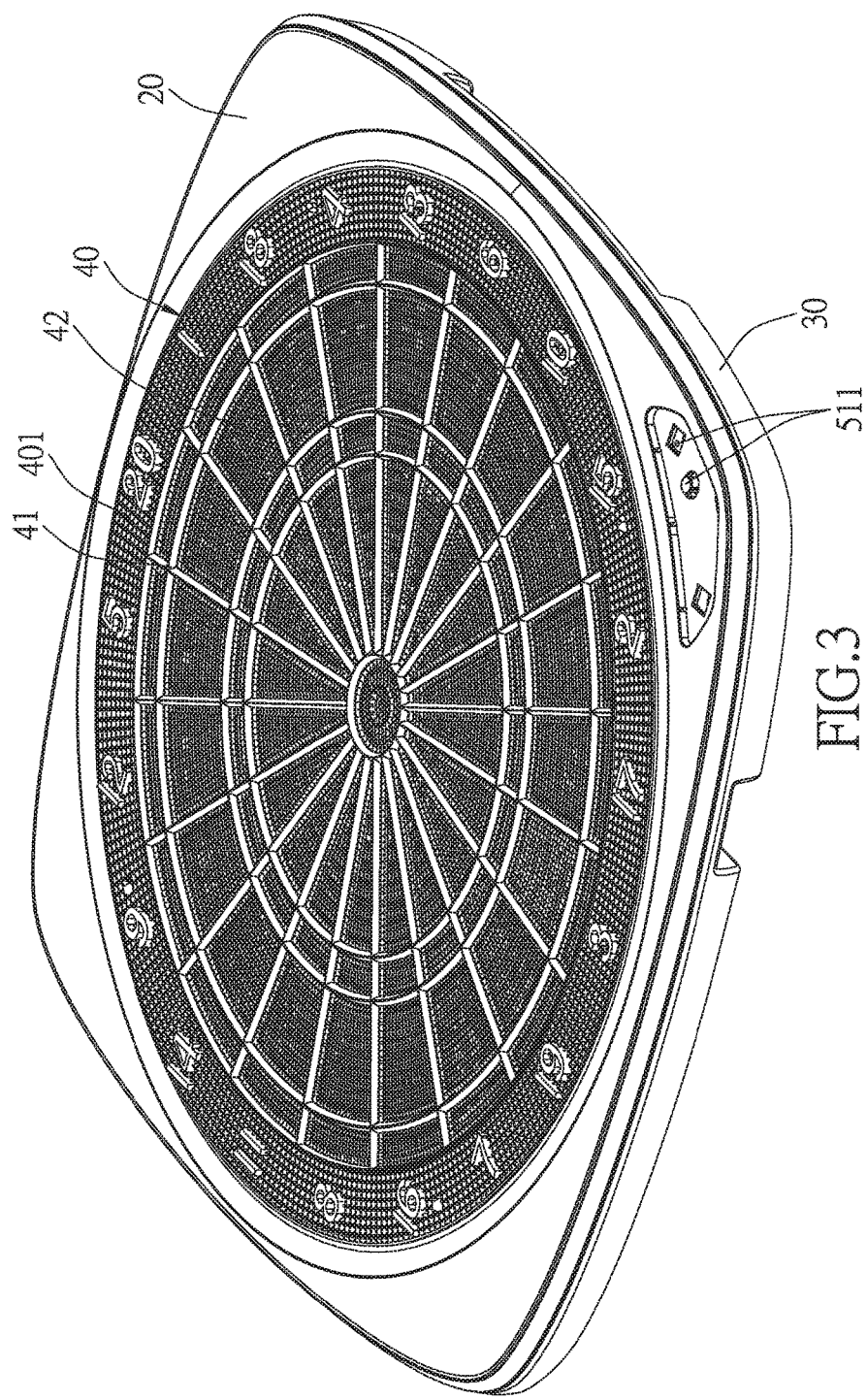
FIG. 3 is a perspective view of a rear cover of a dartboard and a noise attenuation structure thereof in accordance with a preferred embodiment of the present invention.
Figure 4:
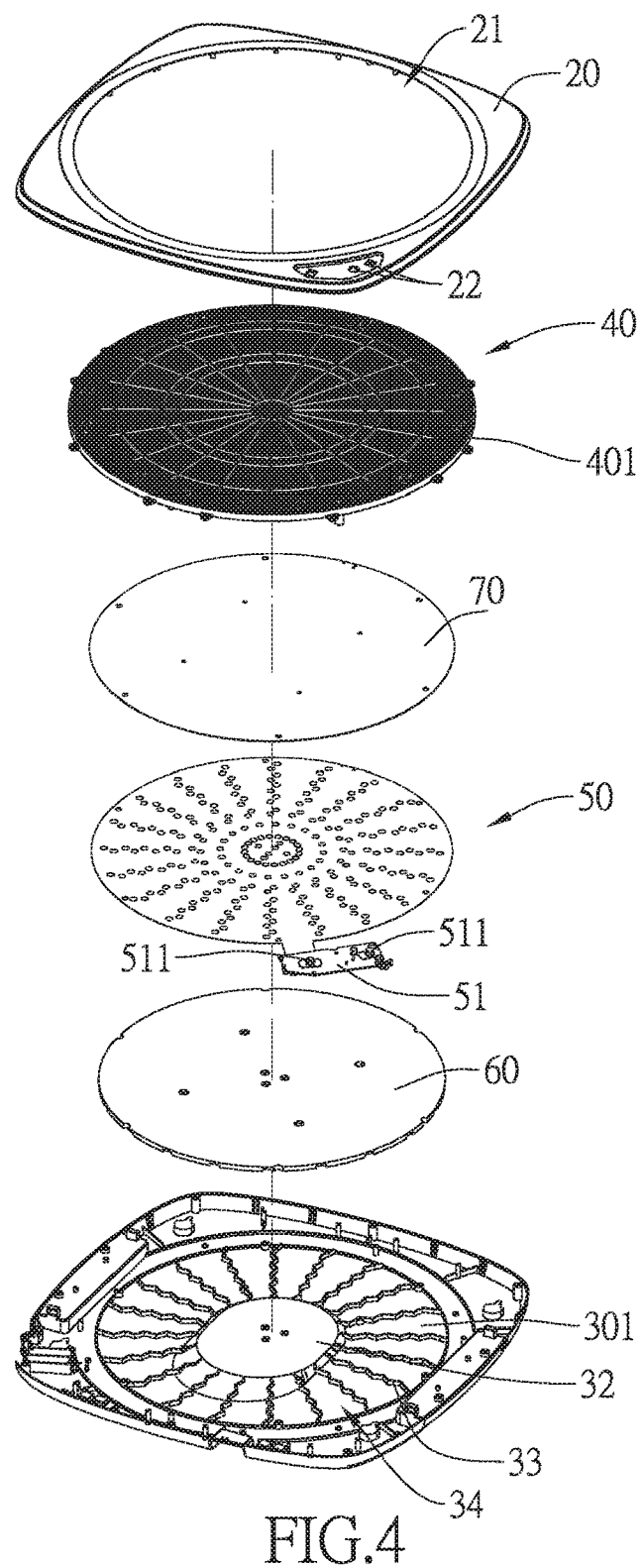
FIG. 4 is an exploded view of the rear cover of a dartboard and the noise attenuation structure thereof in accordance with the preferred embodiment of the present invention.
Figure 5:
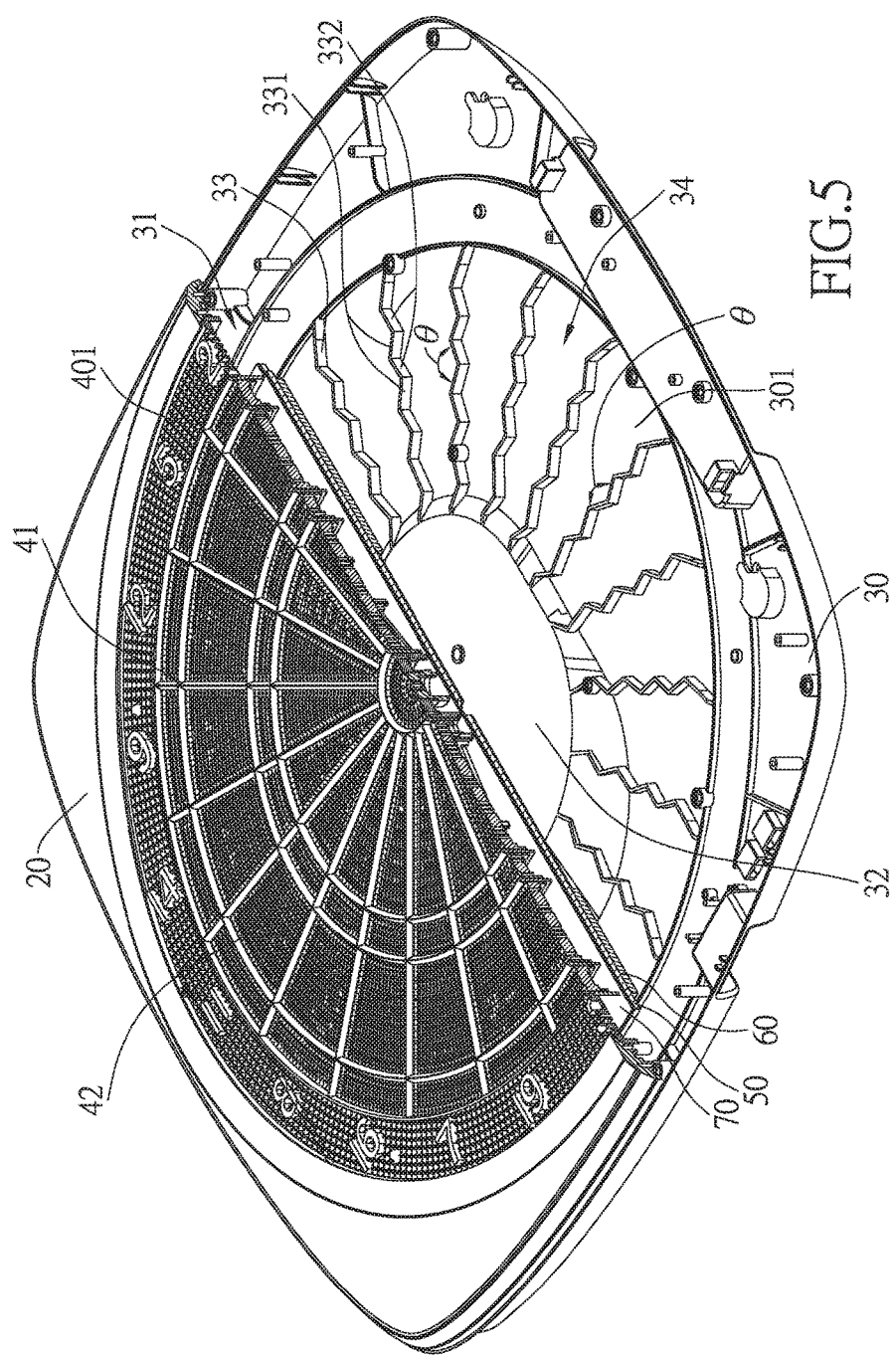
FIG. 5 is a cross sectional view of the rear cover of a dartboard and the noise attenuation structure thereof in accordance with the preferred embodiment of the present invention.
Figure 6:
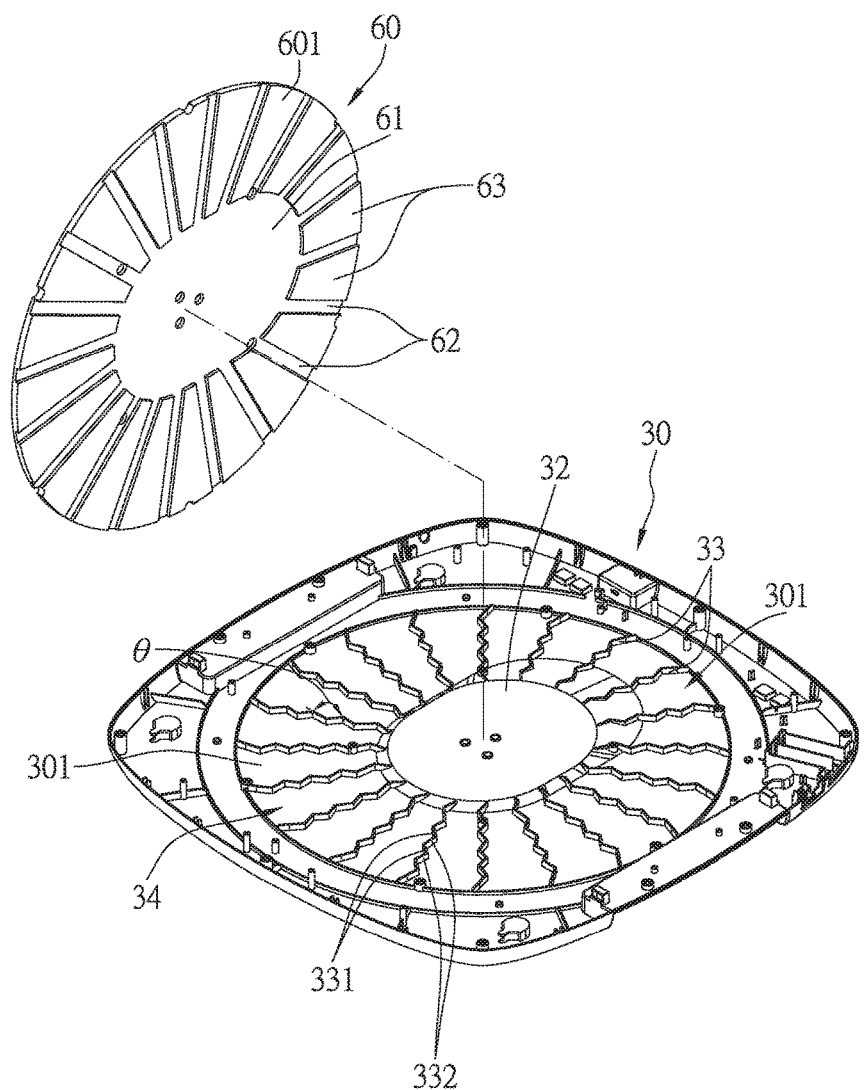
FIG. 6 is an exploded view of the rear cover and the shock and sound absorbing pad of the invention.

Referring to FIGS. 3-6, a rear cover 30 of a dartboard and a noise attenuation structure thereof in accordance with the preferred embodiment of the present invention comprises: a decoration cover 20, the rear cover 30, a scoring board 40, a circuit board 50, a shock and sound absorbing pad 60, and a damping pad 70.

The decoration cover 20 includes an opening 21 which opens in a vertical direction Y, and a plurality of operation holes 22 which also open in the vertical direction Y.

The rear cover 30 and the decoration cover 20 define a receiving space 31 in communication with the opening 21 and the respective operation holes 22. The rear cover 30 is provided with a bottom 301 located towards the receiving space 31. The bottom 301 includes a central portion 32 at the center of the rear cover 30 and a plurality of reinforced ribs 33 radially extending from the central portion 32 towards a peripheral edge of the rear cover 30. In this embodiment, each of the reinforced ribs 33 includes a plurality of first sections 331 and a plurality of second sections 332. The first and second sections 331, 332 are connected in an alternative manner, and each of the first sections 331 defines an angle θ with respect to each of the second sections 332, so that each of the reinforced ribs 33 as a whole has a zigzag shape, and thus every two neighboring reinforced ribs 33 defines a resonant space 34 with respect to the bottom 301.

The scoring board 40 is disposed in the receiving space 31 and provided with a scoring surface 401 which is divided into a plurality of scoring areas 41, and in each of the scoring areas 41 is disposed a target block 42 which is provided with a plurality of dart holes for insertion of the dart. The scoring surface 401 is located towards the opening 21.

The circuit board 50 is disposed in the receiving space 31 and electrically connected to the scoring board 40. The circuit board 50 includes an operation portion 51 which is provided with a plurality of operation buttons 511 extending out of the operation holes 22.

The shock and sound absorbing pad 60 is disposed in the receiving space 31 and located between the bottom 301 and the circuit board 50. One surface of the shock and sound absorbing pad 60 facing the bottom 301 is provided with a noise attenuation surface 601 which is provided with a recess 61 and a plurality of grooves 62. The recess 61 is located at the center of the noise attenuation surface 601. Each of the grooves 62 has one end connected to the recess 61 and another end extending to a peripheral edge of the shock and sound absorbing pad 60. The grooves 62 are arranged in a radial manner, and every two grooves 62 define a stuffing portion 63. The central portion 32 is disposed in the recess 61 in such a manner that the reinforced ribs 33 are disposed in the grooves 62, and the stuffing portions 63 are stuffed in the resonant spaces 34.

The damping pad 70 is made of vibration buffering material. The damping pad 70 is disposed between the scoring board 40 and the circuit board 50, and used to buffer the impact force caused by the dart.

What mentioned above are the structural relations of the main components of the invention, and the manner of using the invention is explained as follows.

As shown in FIGS. 3-6, when the user throws the dart at the scoring board 40, and the dart is landed on one of the target blocks 42, the tip of the dart will hit the damping pad 70, and the damping pad 70 then triggers the circuit board 50. The damping pad 70 can attenuate the collision between the scoring board 40 and the target blocks 42, thus reducing noise. The rest of the vibration will be transmitted to and absorbed by the shock and sound absorbing pad 60, so that the vibration is substantially weakened and attenuated, and then the weakened vibration enters the receiving space 31 and the resonant spaces 34. With the help of the reinforced ribs 33 and the stuffing portions 63 stuffed in the resonant spaces 34, it is difficult for the vibration to produce resonance in the resonant spaces 34, which consequently prevents the generation of noise.

Preferably, the reinforced ribs 33 are disposed at the bottom 301 to improve the structure strength of the rear cover 30. The reinforced ribs 33 can reduce the occurrence of deformation and shrinkage in the manufacturing process of the rear cover 30, and can also be used as vents during plastic injection molding to prevent the occurrence of grains during the process of plastic injection molding. The reinforced ribs further can stabilize the overall structure of the rear cover 30, so that the circuit board 50 is not susceptible to interference, which consequently reduces false judgment made by the circuit board 50.

Hence, the rear cover of a dartboard and the noise attenuation structure thereof not only can attenuate the noise caused by dart throwing, but also can prevent false judgment made by the circuit board 50, with the help of the reinforced ribs 33 and the rear cover 30.

While we have shown and described various embodiments in accordance with the present invention, it is clear to those skilled in the art that further embodiments may be made without departing from the scope of the present invention.

What is claimed is:

1. A rear cover of a dartboard and a noise attenuation structure thereof, comprising:
   the rear cover including a bottom and a plurality of reinforced ribs disposed at the bottom of the rear cover;
   a decoration cover including an opening which opens in a vertical direction, wherein the rear cover and the decoration cover define a receiving space in communication with the opening;
   a scoring board disposed in the receiving space and provided with a scoring surface which is located towards the opening;
   a circuit board disposed in the receiving space and electrically connected to the scoring board; and
   a shock and sound absorbing pad disposed in the receiving space and located between the bottom and the circuit board;
   wherein every two said reinforced ribs defines a resonant space with respect to the bottom, one surface of the shock and sound absorbing pad facing the bottom is a noise attenuation surface which is provided with a plurality of grooves, every two said grooves define a stuffing portion, the reinforced ribs are disposed in the grooves, and the stuffing portions are stuffed in the resonant spaces.

2. The rear cover of the dartboard and the noise attenuation structure thereof as claimed in claim 1, wherein the damping pad is made of vibration buffering material and disposed between the scoring board and the circuit board.

3. The rear cover of the dartboard and the noise attenuation structure thereof as claimed in claim 1, wherein the decoration cover includes a plurality of operation holes which open in the vertical direction and are in communication with the receiving space, and the circuit board includes an operation portion which is provided with a plurality of operation buttons extending out of the operation holes.

4. The rear cover of the dartboard and the noise attenuation structure thereof as claimed in claim 1, wherein the bottom includes a central portion at a center of the rear cover, and the plurality of reinforced ribs radially extends from the central portion towards a peripheral edge of the rear cover.

5. The rear cover of the dartboard and the noise attenuation structure thereof as claimed in claim 1, wherein the scoring surface is divided into a plurality of scoring areas, and in each of the scoring areas is disposed a target block which is provided with a plurality of dart holes for insertion of a dart.

6. The rear cover of the dartboard and the noise attenuation structure thereof as claimed in claim 1, wherein the scoring surface is located towards the opening.

7. A rear cover of a dartboard and a noise attenuation structure thereof, comprising:
   the rear cover including a bottom and a plurality of reinforced ribs disposed at the bottom of the rear cover;
   a decoration cover including an opening which opens in a vertical direction, wherein the rear cover and the decoration cover define a receiving space in communication with the opening;
   a scoring board disposed in the receiving space and provided with a scoring surface which is located towards the opening;
   a circuit board disposed in the receiving space and electrically connected to the scoring board; and
   a shock and sound absorbing pad disposed in the receiving space and located between the bottom and the circuit board;
   wherein one surface of the shock and sound absorbing pad facing the bottom is a noise attenuation surface which is provided with a recess and a plurality of grooves, the recess is located at a center of the noise attenuation surface, each of the grooves has one end connected to the recess and another end extending to a peripheral edge of the shock and sound absorbing pad, and the grooves are arranged in a radial manner.

8. The rear cover of the dartboard and the noise attenuation structure thereof as claimed 7, wherein the damping pad is made of vibration buffering material and disposed between the scoring board and the circuit board.

9. The rear cover of the dartboard and the noise attenuation structure thereof as claimed in claim 7, wherein the decoration cover includes a plurality of operation holes which open in the vertical direction and are in communication with the receiving space, and the circuit board includes an operation portion which is provided with a plurality of operation buttons extending out of the operation holes.

10. The rear cover of the dartboard and the noise attenuation structure thereof as claimed in claim 7, wherein the bottom includes a central portion at a center of the rear cover, and the plurality of reinforced ribs radially extends from the central portion towards a peripheral edge of the rear cover.

11. The rear cover of the dartboard and the noise attenuation structure thereof as claimed in claim 7, wherein the scoring surface is divided into a plurality of scoring areas, and in each of the scoring areas is disposed a target block which is provided with a plurality of dart holes for insertion of a dart.

12. The rear cover of the dartboard and the noise attenuation structure thereof as claimed in claim 7, wherein the scoring surface is located towards the opening.

\* \* \* \* \*